US006233024B1

United States Patent
Hiller et al.

(10) Patent No.: US 6,233,024 B1
(45) Date of Patent: May 15, 2001

(54) REAR PROJECTOR

(75) Inventors: Klaus Hiller, Gera; Frank Goepfert, Jena, both of (DE)

(73) Assignee: LDT GmbH & Co. Laser-Display-Technologie KG, Gera (DE)

( * ) Notice: Subject to any disclaimer, the term of this patent is extended or adjusted under 35 U.S.C. 154(b) by 0 days.

(21) Appl. No.: 09/139,912

(22) Filed: Aug. 26, 1998

(30) Foreign Application Priority Data

Aug. 29, 1997 (DE) .............................................. 197 37 861

(51) Int. Cl.⁷ .............................. H04N 5/64; H04N 5/74; H04N 5/66; G03B 21/22; G03B 21/14; G03B 21/60

(52) U.S. Cl. .......................... 348/744; 348/744; 348/756; 348/751; 348/782; 348/804; 348/787; 353/74; 353/77; 353/78; 353/79; 359/453; 359/456; 359/460; 359/196

(58) Field of Search ..................................... 348/744, 756, 348/759, 781, 782, 783, 787, 788, 804; 349/5, 7, 67, 57; 353/74, 77–79; 359/453, 456, 460, 196

(56) References Cited

U.S. PATENT DOCUMENTS 4,030,821 * 6/1977 Badalich ................. 353/71
4,136,935 * 1/1979 Cook et al. ............. 352/104
4,439,027 * 3/1984 Shioda et al. ............ 353/77
5,223,869 * 6/1993 Yanagi ..................... 353/78
5,546,200 * 8/1996 Nicolas et al. ........... 359/15
5,796,446 * 8/1998 Marcellin-Dihon ...... 348/744
5,897,192 * 4/1999 Seufert .................... 353/74

* cited by examiner

Primary Examiner—Reinhard Eisenzopf
Assistant Examiner—Paulos Natnael
(74) Attorney, Agent, or Firm—Reed Smith LLP

(57) ABSTRACT

In a rear projector with a housing on whose front side is arranged a screen for displaying a video picture, with a brightness-modulated and color-modulated R-G-B light source for emitting a light bundle, with a deflecting device for scanning this light bundle, wherein the light bundle is deflected by the deflecting device over a total angle $\alpha$ with respect to vertical scanning, and with a deflecting mirror which is located in the housing and arranged at an angle $\delta$, wherein the light bundle exiting from a real or virtual vertex of the total deflection angle $\alpha$ is deflected onto the screen by the deflecting mirror, the virtual or real vertex located in front of the deflecting mirror lies at a location where the smallest angle $\beta$ of the light bundle to the surface of the screen during deflection is less than 20° and the angle $\delta$ is given by $$\delta \leq 45° - \frac{\alpha}{4} + \beta.$$

8 Claims, 9 Drawing Sheets

REAR PROJECTOR

BACKGROUND OF THE INVENTION a) Field of the Invention

The invention is directed to a rear projector with a housing on whose front side is arranged a screen for showing a video picture, with a brightness-modulated and color-modulated R-G-B light source for emitting a light bundle, with a deflecting device for scanning this light bundle, wherein the light bundle is deflected by the deflecting device over a total angle $\alpha$ with respect to vertical scanning, and with a deflecting mirror which is located in the housing and arranged at an angle $\delta$, wherein the light bundle exiting from a virtual vertex of the total deflection angle $\alpha$ is deflected on the screen by the deflecting mirror.

b) Description of the Related Art

Rear projectors of this kind are known from the German DE 43 24 849 C2. The deflecting mirror known from this reference is intended to reduce the construction depth. The reasoning behind this is as follows: Due to the laws governing geometrical optics, a determined optical path is predetermined by the image size. Particularly in a rear projector according to DE 43 29 849 C2, image generation relies on angular deflections of light bundles. Therefore, a magnification of the image is always tied to an increase in the dimensions of the device. This means that the construction depth that can be achieved is always limited for a given image size.

In order to provide small housing depths, that is, the flattest rear projectors possible, the optical beam path is folded via the deflecting mirror. While only one deflecting mirror is used for this purpose in accordance with the reference cited above, devices are also known from DE 31 52 020 A1 and U.S. Pat. No. 4,003,080 in which three deflecting mirrors are used.

OBJECT AND SUMMARY OF THE INVENTION

It is the primary object of the invention to optimize known rear projectors with respect to construction depth.

This object is met in that the virtual or real vertex located in front of the deflecting mirror lies at a location where the smallest angle $\beta$ of the light bundle to the surface of the screen during deflection is less than 20° and the angle $\delta$ is given by $\delta \leq 45° - \alpha/4 + \beta$ wherein angle $\delta$ is determined for curved mirror surfaces between the projection surface and the chord between the extreme points of incidence of the light bundle on the deflecting mirror during vertical scanning over the angle $\alpha$.

Based on this teaching, the construction depth of a rear projector can be optimized at any deflection angle $\alpha$ contingent upon the device. In particular, it has turned out that the deflecting mirror which lies closest to the screen with reference to the light propagation makes the greatest contribution for such optimization. If only one deflecting mirror is used, the light bundle reaches the latter directly after it has exited from the deflecting device. In this case, the above-mentioned vertex is a real point and is located at the point of deflection in the deflecting device or in the exit pupil of optics arranged subsequent thereto.

If a plurality of deflecting mirrors are used, the vertex to be considered in this case in front of the last deflecting mirror with respect to the light path is a mirror image and is therefore virtual. Regardless of whether the vertex is virtual or real, the same principle is applicable.

In order to provide a compact construction, the deflecting mirror should be as close as possible to the projection screen. The limits to be adhered to for optimization are substantially dependent on the size of the screen and on the dimensions of the rest of the housing. Surprisingly, however, it has turned out that the desired behavior can be described, independent from the construction shape in other respects, by the smallest possible angle $\beta$ of the light bundle relative to the vertical line. Accordingly, it is maintained that this angle should be less than 20°. It could have been assumed that the angle should be as small as possible, that is, virtually 0°. However, an angle other than 0° but especially less than 5°, 10° or 20°, in a particularly compact rear projector also allows for sufficient space for operating controls and loudspeakers at the front. Given a selection of suitable conditions where other projection conditions remain similar, an enlargement of the angle $\beta$ leads to smaller angle $\delta$ of the deflecting mirror relative to the screen which plays a substantial part in determining the achievable reduction in the depth of the housing. With respect to $\delta$, it has turned out to be especially advantageous when this angle is selected according to the inequality indicated above.

The teaching is applicable for plane mirrors as well as for curved mirror surfaces. However, while the meaning of angle $\delta$ is uniquely defined for plane mirrors, a corresponding condition must be found for curved mirror surfaces.

When it is considered that the angle $\delta$ substantially defines the depth for the housing of the rear projector based on the position of the edges of the deflecting mirror, it can be seen that the angle $\delta$ in the case of curved mirror surfaces has a similar meaning for plane mirrors when it is determined as the angle between the projection surface and the chord between the projection surface and the extreme points of incidence of the light bundle during vertical scanning over angle $\alpha$. In this case, one of the extreme points of incidence is given at deflection angle 0° and the other is given at the total deflection angle $\alpha$.

A more compact video device can be provided, according to an advantageous further development of the invention, in that the vertex is virtual and is generated by additional deflecting mirrors in the rear projector, that is, when the optical path is folded by additional mirrors.

It can be seen from the above-mentioned inequality for angle $\delta$ that the choice of this angle is relatively open. Further, any curved mirror surfaces can be used for deflecting mirrors. At very small angle $\delta$ or large curvatures, however, disadvantages can be expected for video projection in that geometric imaging errors occur such as those known in the case of oblique projection of slides. In particular, trapezoidal images are generated in this case.

These geometry errors should be avoided as far as possible. In view of this requirement, the selection of the angle $\delta$ would ultimately be restricted further. On the other hand, it would be desirable to keep the angle $\delta$ very small in the interest of the smallest possible construction depth without having to allow for any kind of restriction of $\delta$.

In order to be able to keep the construction depth as small as possible, therefore, according to an advantageous further development of the invention, a computing device is provided for recalculating the video picture prior to projection with respect to distortion due to oblique projection or curvature of the deflecting mirror and a control device is provided which controls the deflection and/or intensity modulation of the light bundle, so that there appears on the screen in the image direction a virtually undistorted video picture which diverges from an equal distribution of lines by less than 30%, particularly less than 10%, with respect to line spacing.

Accordingly, any mirror shapes and very small angles of δ can be used in that the image for image generation is distorted in an opposite sense with respect to the geometric errors resulting from the construction, so that after the geometrically distorting deflection a virtually undistorted image is formed again on the projection screen. The limit for permissible image errors is essentially subjective. In this regard, tests have shown that video pictures in which line spacing deviates from an equal distribution in the range of 30%, especially less than 10%, are still perceived as acceptable by viewers.

Image distortions of this kind for compensation of image errors are known. In general, this compensation can be achieved by calculating the image displayed in a distorted manner by deflection from the image to be displayed without distortion. Another possibility consists in controlling the deflecting device in a manner diverging from uniform, temporally constant angular deflection, for which suitable control circuits can be provided. Depending on the type of geometric correction, it may also be necessary to control the intensity differently than in the case of the undistorted image.

Smaller images sizes result when the screen is arranged at a reduced distance from the deflecting mirror. However, at greater distances, the construction depth increases. According to a further development of the invention, it has proven optimal when the distance of the screen from the point on the deflecting mirror on which the light bundle impinges at an angle $\beta$ is less than 10 cm and, in particular, less than 3 cm.

At a distance in this range, the light paths can also be shortened by additional deflecting mirrors when the deflecting device is arranged within this distance and is then imaged by the additional deflecting mirror in the last deflecting mirror in the direction of the propagation of light. This advantage will be illustrated more fully hereinafter with reference to an embodiment example.

The above-mentioned distortion with additional computing means can be reduced according to a preferred further development of the invention in that the deflecting mirror is a plane mirror and a light bundle reflected at deflection angle $\alpha/2$ in the direction of the deflecting mirror impinges vertically on the screen. Trapezoidal distortions disappear in this case. However, distortions which are generated by the deflecting device such as pillow distortions, persist and are either in the tolerated range or can be corrected with a computing device or by special controlling of the deflection as was described above.

In principle, the R-G-B light source can be arranged at different locations in the housing. A rear projection proceeding from the top of the housing, especially using two deflecting mirrors, is certainly possible. However, stability problems can result when the R-G-B light source has solid-state lasers, for example, because the center of gravity is then shifted upward very far due to the weight of these lasers.

With respect to the light sources of this type mentioned by way of example, it is provided according to an advantageous further development that the R-G-B light source is arranged on the bottom of the housing. In this case, a majority of the weight is located in the vicinity of the base and the center of gravity of the rear projector is located correspondingly low, so that the stability of the rear projector is increased. This likewise solves the problem of optimizing the construction depth, because in very flat arrangements with a small construction depth there would be a risk of falling over, which can be avoided either only by a larger construction depth of the housing or by shifting the center of gravity as in this further development of the invention.

However, this does not mean that the deflecting device must also necessarily be arranged at the bottom, because the deflecting device can be separated from the R-G-B light source by meas of a light-conducting fiber. However, it has also proven especially advantageous for optimizing the device when the deflecting device is likewise arranged far down in the rear projector because this results in particularly favorable projection geometries. This will become clearer with reference to embodiment examples described hereinafter.

In principle, any desired scaling of the construction can be carried out, since the distance of the deflecting device from the projection surface is substantially determined by the deflection angle which is a non-dimensional quantity in principle. Therefore, in the case of a fixed desired image size, the construction depth can only be further reduced after its optimization when the deflection angle $\alpha$ is increased. For this purpose, according to an advantageous further development, the deflecting device contains magnification optics that have been corrected for the tangential condition for proportional magnification of the tangent of the deflection angle.

In general, it would be assumed that any desired expansion optics would meet this object. However, it has been shown that the above-mentioned magnification optics in particular which are corrected with respect to the tangential condition and deliver a proportional magnification of the tangent of the deflection angle are especially suitable because they can be suitably corrected with respect to optical errors. Additional correction possibilities, especially for compensating for the irregular line density due to the tangential dependency of the deflecting device can then also be compensated by means of the above-mentioned rectification for geometric image errors.

The invention enables a drastic reduction of the dimensions of the device. The height of the device is in the order of magnitude of the image height, especially for projections with geometric image errors for which an additional recalculation of an image is carried out for rectification.

It has turned out that the depth of the device in devices of this kind with screen diagonals of greater than two meters can be substantially smaller than 50 cm. In the case of comparatively large screen dimensions, a ratio of screen diagonal to depth of between 6:1 and 10:1 is achieved. In this respect, the imaging errors are minimal and not detectable by the eye in a conventional video picture.

In particular, advantages result with respect to construction depth in a rear projector by which color images are illuminated on a screen by an intensity-modulated and color-modulated R-G-B light source and which has the following features:

- an electronic control device,
- a collinear light source which can be brightness-modulated and color-modulated and which couples light in a deflecting device comprising a line mirror, an image mirror and magnification optics following the latter,
- at least one deflecting mirror in the light direction, followed by
- a screen which comprises a plurality of optically acting structures which are arranged in layers one behind the other, especially a Fresnel lens whose object-side focal point is imaged in the exit pupil of the magnification optics or of the deflecting device and whose Fresnel structure lies on the light entrance side considered in the direction of light, followed by a disk with defined predetermined vertical and horizontal scattering.

It is further provided in this device that the light path of the first or last line extends virtually parallel to the screen surface and the angle β between the screen and the light path of the first or last line is greater than or equal to 0° and less than 20°, and the distance between the screen and a mirror edge is greater than 0 mm and, in particular, is 1 to 30 mm, Further, when the optical axis of the deflecting device is determined at α/2 proceeding from the projection of the first line and α is the maximum total deflection angle of the deflecting device in the image direction, the angle δ between the screen and the deflection angle is determined in such a way that it is less than or equal to 45° minus one fourth of the optically acting total deflection angle α of the image mirror plus angle β of the projection of the first line relative to the screen at which the first line impinges on the deflecting mirror.

Based on the construction of the screen mentioned above, a greater degree of light radiation is achieved together with the image generation by means of the writing collinear R-G-B light source. Due to the layout of the optical arrangement overall, especially the screen structure, a defined light radiation results in the horizontal and vertical direction in the viewing space. Further, the space enclosed by the housing is utilized in an optimum manner.

This device can also be further developed in an advantageous manner as follows:

1. The deflecting device is located in the bottom part of the housing on the screen side; the optical axis of the deflecting device lies at an angle in the region between the half deflection angle α of the deflecting device of the rear projector plus the angle β to the screen, wherein a deflecting mirror is arranged subsequently, considered in the direction of light, on the top side at an angle δ less than or equal to 45°+β−α/2 to the screen and with an upper edge adjoining the upper edge of the screen, and the optical construction is symmetrical with reference to a vertical screen axis.
2. The projection axis of the deflecting device is aligned in such a way by the deflecting mirror or deflecting mirrors that it extends at a right angle to the center of the screen.
3. The projection axis of the deflecting device is oriented by the angle δ of the deflecting mirror in such a way that this axis extends at an inclination X to the screen with respect to the center of the lines. Further, an electronic control is provided which eliminates the distortion of the line length, line spacing, image point spacing and/or brightness and color of the respective image point due to the resulting oblique projection at an angle X.
4. Another deflecting mirror is arranged in the beam path between the deflecting mirror and the deflecting device, which additional deflecting mirror deflects the beam path opposite to the direction of light in the direction of the rear housing portion on the bottom, so that the optical axis of the deflecting device is between 70° and 120° to the screen, which signifies a reduction in construction height.
5. The deflecting mirror and the additional deflecting mirror mentioned above are parallel to one another.
6. The deflecting mirror has a trapezoidal shape and is arranged with its narrow broad side at the bottom and faces away from the screen.
7. An additional deflecting mirror likewise has a trapezoidal shape and is arranged with its narrow broad side below the last deflecting mirror in the light path.
8. The diagonal angle of the projection, measured from the exit pupil of the projection optics, is in the range of 60° to 110° and, in particular, is 86°.
9. For displaying an image format of 16:9, the vertical deflection angle is between 30° and 50° and, in particular, is 44°, wherein the horizontal deflection angle is between 50° and 85° and, in particular, is 76°.
10. For displaying the image format of 4:3, the vertical deflection angle is between 30° and 50° and, in particular, is 44°, wherein the horizontal deflection angle is between 50° and 85° and, in particular, is 76°.
11. The space below the screen to the bottom of the housing in the region of the front sides is provided as installation space for audio equipment, control devices and operating controls.
12. The light source is a R-G-B laser arrangement which is arranged in the bottom portion of the housing, wherein the control electronics and the video and audio parts are arranged in the bottom portion of the housing.
13. The loudspeakers of the audio part are arranged in the front bottom portion of the housing.
14. The light source which can be modulated with respect to brightness and color is connected with the deflecting device via a plug-in light-conducting fiber connection.

The arrangement of the device for image generation in the bottom portion of the housing leads to an advantageous position of the center of gravity of the device. Due to the distribution in the housing according to the further development, it is also possible to seal the optical channel in a simple manner in such a way that no dust can penetrate. The position of the electronic assemblies for image generation and of the R-G-B light source is completely independent from the optical channel and has good accessibility for maintenance work.

The invention is described more fully hereinafter with reference to embodiment examples in conjunction with the drawing.

DESCRIPTION OF THE PREFERRED EMBODIMENTS

In the following embodiment examples, the housing has been omitted from the Figures relating to these embodiment examples. However, the minimum dimensions of the housing are shown by the outlines in the embodiment examples. In general, the essential minimum dimensions for the housing are indicated, wherein the image width does not depend on the following considerations and is limited only by the line mirrors of the deflecting system. However, this can be adjusted. The quantity t represents the minimum construction depth, s designates the total height of the rear projector, and h designates the height of the screen.

All of these embodiment examples are based on a projection technique in which a video picture is written on a screen 2 by means of light bundles. This technique is described, for example, in DE 43 24 849 C2, whose contents are referred to expressly in this regard.

Figure 1:
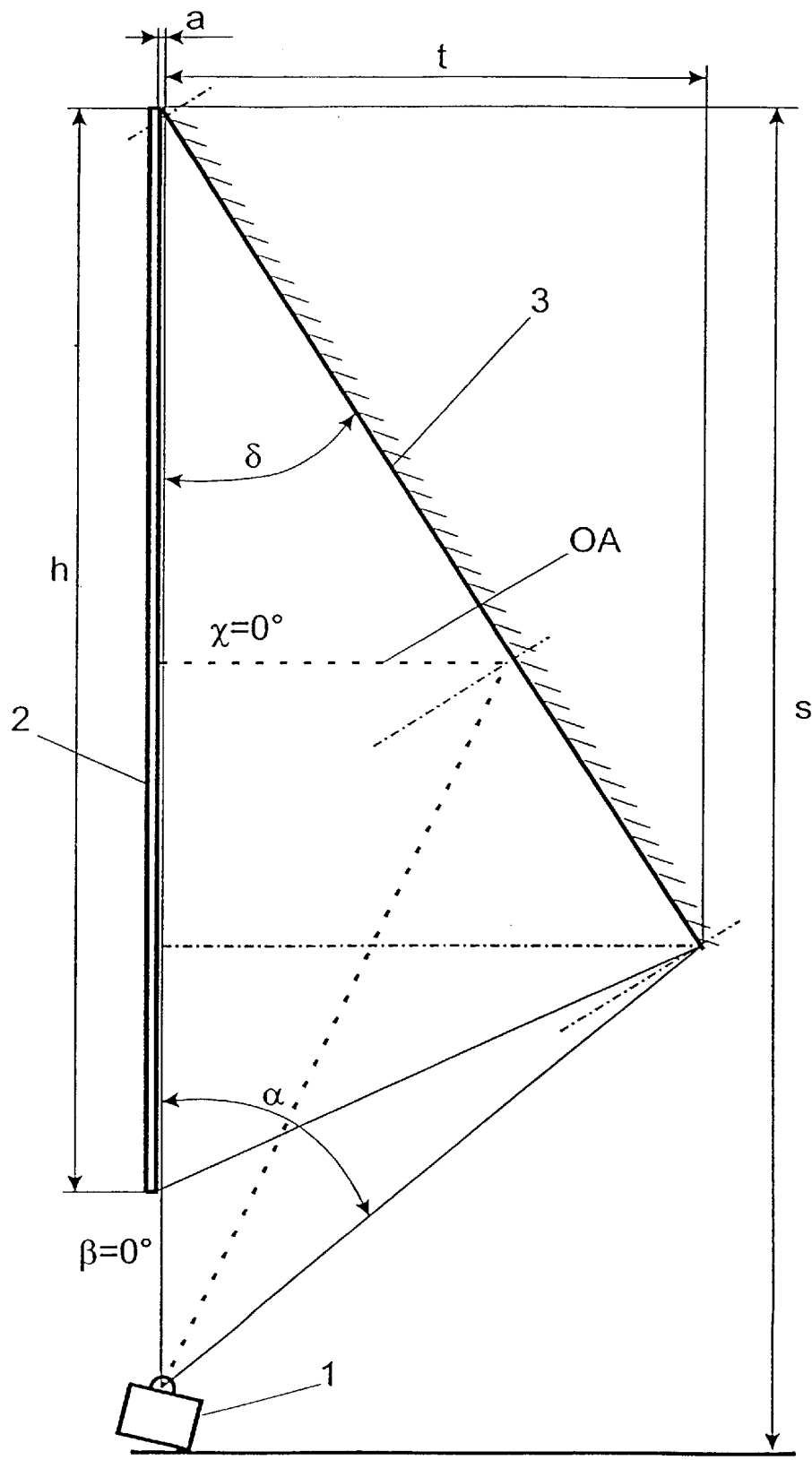
FIG. 1 is a side view of a rear projector with deflecting mirror.

FIG. 1 shows the assemblies of a rear projector which determine its function. A projection assembly 1 shown at the bottom in FIG. 1 contains a brightness-modulated and color-modulated RGB light source and a biaxial deflecting device for scanning the light bundle in two dimensions.

The total deflection angle of concern in this instance for the image deflection is always referred to hereinafter by "α" and the optical axis is designated by "OA".

In this embodiment example, the angle for the first line that is written at the upper edge of the screen 2 for the video picture is 0°. In this case, the light bundle extends parallel to the projection surface on the screen 2. At this angle of 0°, which is generally defined as angle β between the projection surface and the light bundle closest to the screen 2, there is a minimum construction depth for the rear projector. However, as will be seen from the following embodiment example, very small construction depths can also be achieved at angles β other than 0°. In particular, it has turned out that the optimization suggested herein is also possible at angles of up to β=20°.

The distance of the light bundle of the first line from the screen 2 is designated by the quantity a. This distance a should range from 0.5 cm to 3 cm for practical purposes and permits the use of suitable holders for the individual parts of the rear projector. In this regard, it is taken into account that the deflecting mirror 3, for example, can be very heavy due to the size usually aimed for in a rear projector and requires a sufficiently stable holder which occupies a corresponding amount of space. However, as is shown in an embodiment example in FIG. 9, distance a can also differ substantially from 0 and can even be as much as 10 cm in order to provide room for the different projection conditions which are shown in this embodiment example and will be illustrated in detail hereinafter.

For the embodiment example in FIG. 1, distance a should be 0.5 cm if possible, so that the light bundle is at a distance from the screen 2 when writing the first line and is not influenced by the latter, for example, in the event of possible acoustic waves in the screen 2 which can be caused by environmental noise. In order to eliminate the influence of such interference, it must also be taken into account for determining distance a that the screen 2 contains a Fresnel structure in order to guide the light bundle impinging on the screen in a suitable direction to the viewer. By means of the Fresnel structure, the light impinging on the screen 2 due to the manner of operation of the angular deflection is always deflected in the direction of the viewer located in front of the screen 2 regardless of the angle.

The deflecting mirror 3 mentioned in this embodiment example encloses angle δ with the projection surface on screen 2. In order to minimize the construction depth, an upper limit of 45°+β−α/4 has proven optimum for this angle δ. This applies in particular to straight projection. Straight projection means that the optical axis which faces the geometrical center of the projection screen such that its direction is changed due to the deflecting mirror 3 encloses an angle of X=0° with the screen 2.

At very small angles δ, the angle X of the optical axis to the screen 2 increases and lies outside of the center of the screen. In this case, an oblique projection is carried out, wherein it should be noted that geometric image errors occur, such as the known trapezoidal distortions, which can be taken into account when displaying the image. However, a correction is not absolutely necessary for small angles X because these distortions are usually no longer perceived in the case of line lengths which are corrected essentially along the same length when the line spacing diverges from an equal distribution by less than 30%.

The reduction in the construction depth shown in FIG. 1 is extremely advantageous. In the case of a device construction of this kind, the depth t of this device is calculated as follows:

$$t = \frac{h}{\tan\left(45° + \frac{\alpha}{4}\right) + \tan\left(\frac{\alpha}{2}\right)}$$

The construction height s of the rear projection device is also determined essentially only by the total deflection angle α of the image deflection. On the other hand, the further reduction of the construction depth t, shown in FIG. 2, by means of oblique projection and an angle X=30° reduces the construction depth t and the construction height s roughly by an additional third with the picture size h remaining constant in that the deflecting mirror 3 is arranged at a smaller angle δ to the projection surface on the screen than in the example of FIG. 1. The total deflection angle of the image mirror in the projection assembly 1 remains unchanged.

As was already mentioned above, the geometric distortion due to an oblique projection at an angle X diverging from zero can be compensated by a rectification of the image. In this case, other corrections, for example, pillow distortions, due to the deflecting device and the unevenness of the lines because of the tangential dependency between the angle and the point of incidence can also be compensated at the same time. Such rectification of geometric errors can be carried out by calculating a distorted image which is determined according to the occurring distorting functions through deflection and other optical influences, whereupon the image is displayed in the usual manner. Another possibility consists in controlling the deflecting device with respect to the image point density required because of the distortion in such a way through suitable functions that every image point is imaged on the screen 2 at the location predetermined for the video image to be displayed without distortion. A further improvement for an image display which is as correct as possible consists in that the intensity of the laser beam is also controlled with respect to illumination times which may be different for every image point depending on the methods used for rectification.

Figure 2:
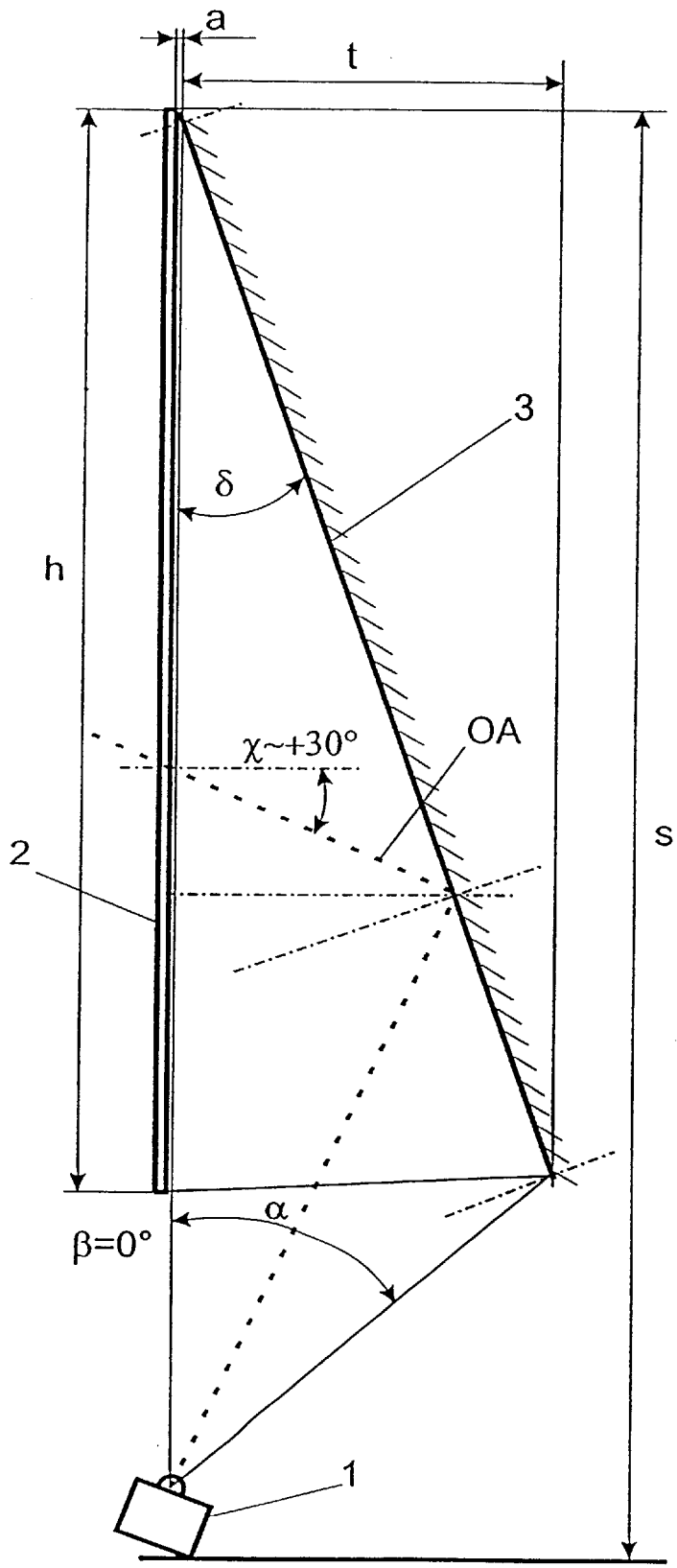
FIG. 2 is a side view of a rear projector with deflecting mirror and oblique projection at an angle X of approximately 30°.

The angle β, which is zero degrees in FIGS. 1 and 2, can also be less than 10° or 5° instead of the upper limit of 20° mentioned above so as to enable the smallest possible construction depth t on the one hand and to prevent the projection assembly 1 from jutting out of the device on the screen side on the other hand.

Figure 3:
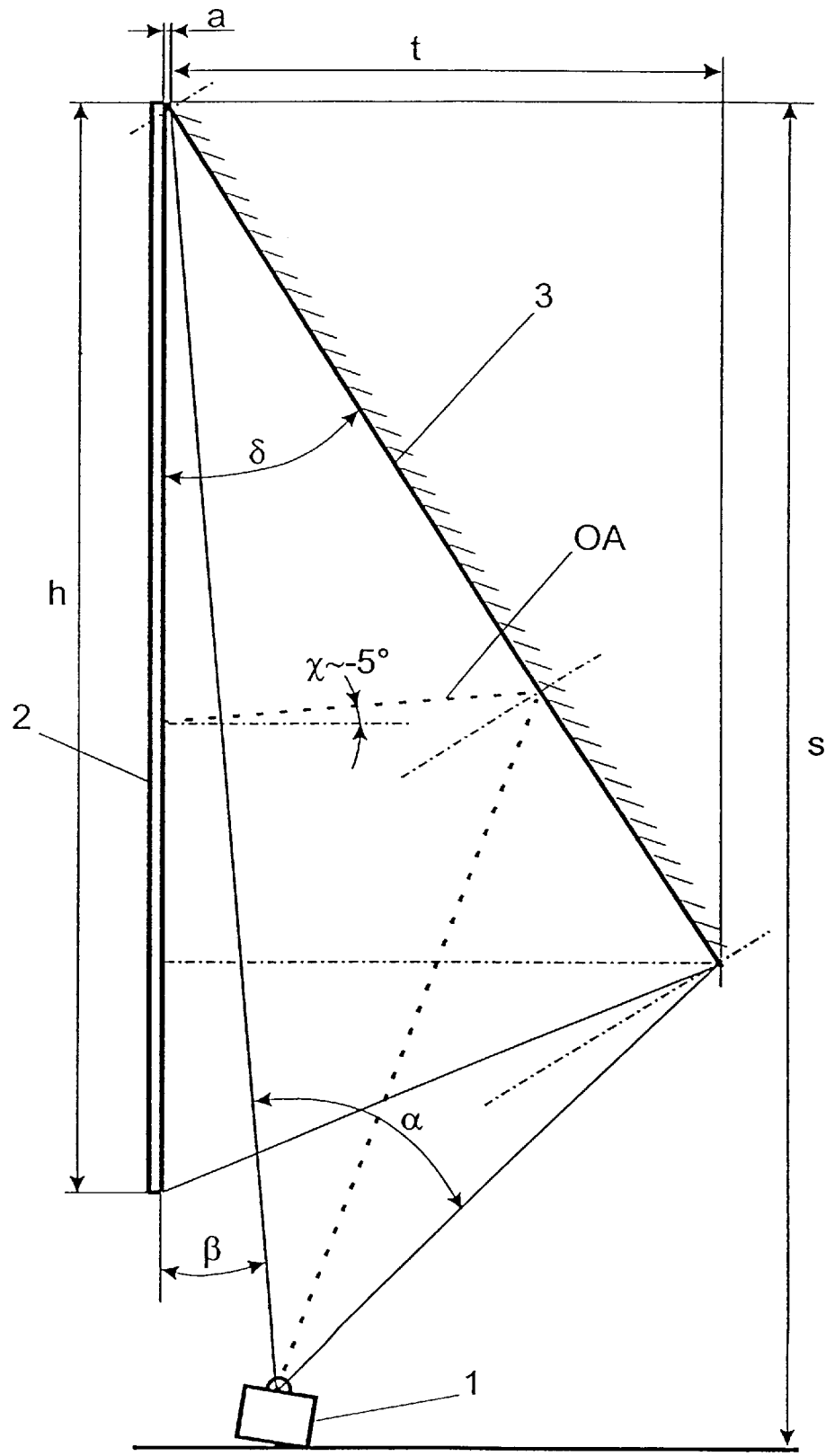
FIG. 3 shows a rear projector with an angle β of the light bundle other than zero for the first line relative to the screen.

FIG. 3 shows an embodiment example similar to that in FIG. 1, but with an altered angle β of 5°. In this case, the optical axis is inclined because of the orientation of the projection assembly 1 relative to the screen 2. Angle δ is selected equal to FIG. 1.

As can clearly be seen from FIG. 3 compared to FIG. 2, the projection assembly 1 is clearly shifted into the interior of the device when angle β differs from zero, wherein the dimensioning of the deflecting mirror 3 and the device depth t are only insignificantly larger.

Further, an oblique projection at a small angle of X=−5° must also be taken into account. Whether or not it is absolutely desirable to carry out image rectification for such small angles essentially depends on the quality with which the images are to be displayed.

The shifting of the projection device 1 into the interior of the housing which is made possible in this way is advantageous because it creates space at the front side for the installation of a device for channel selection, a video recorder, and the like.

Figure 4:
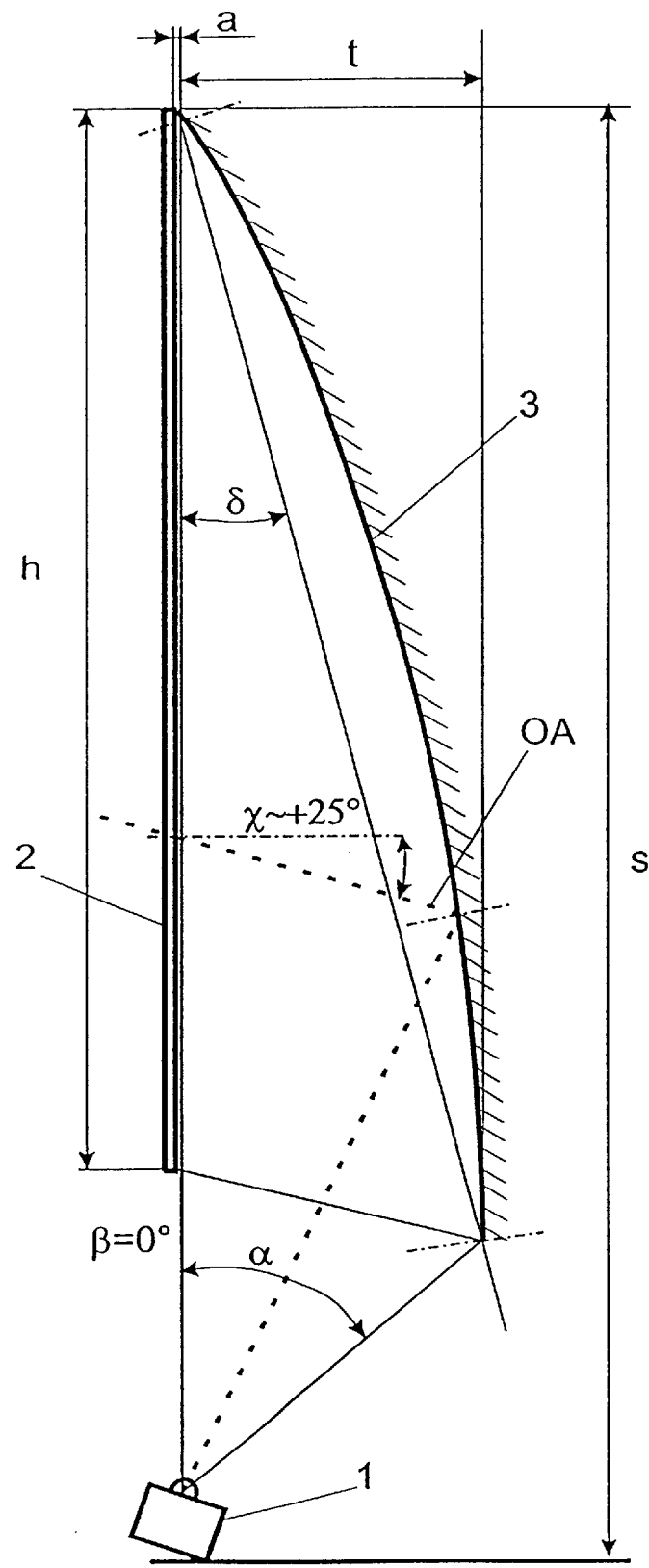
FIG. 4 shows a rear projector with curved, focussing deflecting mirror.

FIG. 4 shows an embodiment example where β=0°, but with a curved deflecting mirror 3. In this case, a construction depth t is shown which is also appreciably reduced with respect to the similar example in FIG. 2 with other parameters remaining the same.

This embodiment example shows a convex mirror curvature which ensures a mechanical stable construction on the one hand and also focusses the light bundle on the other hand, so that the resolution of the image points is increased and the image quality is therefore improved. When the video picture is corrected for geometric image errors, this curvature of the deflecting mirror 3 must also be taken into account, for example, when recalculating the image.

As can be seen from FIG. 4, the angle δ which is defined in a simple manner in plane mirrors, can also be suitably selected. In order to obtain these ratios as in the case of plane mirrors with respect to the construction depth, the angle δ should be determined approximately by the outer corners of the deflecting mirror 3. That is, in the case of curved mirrors, angle δ is to be determined between the projection surface, that is, the surface of the screen 2, and the chord at the extreme points of deflection over the total angle α as is also shown in FIG. 4.

Figure 5:
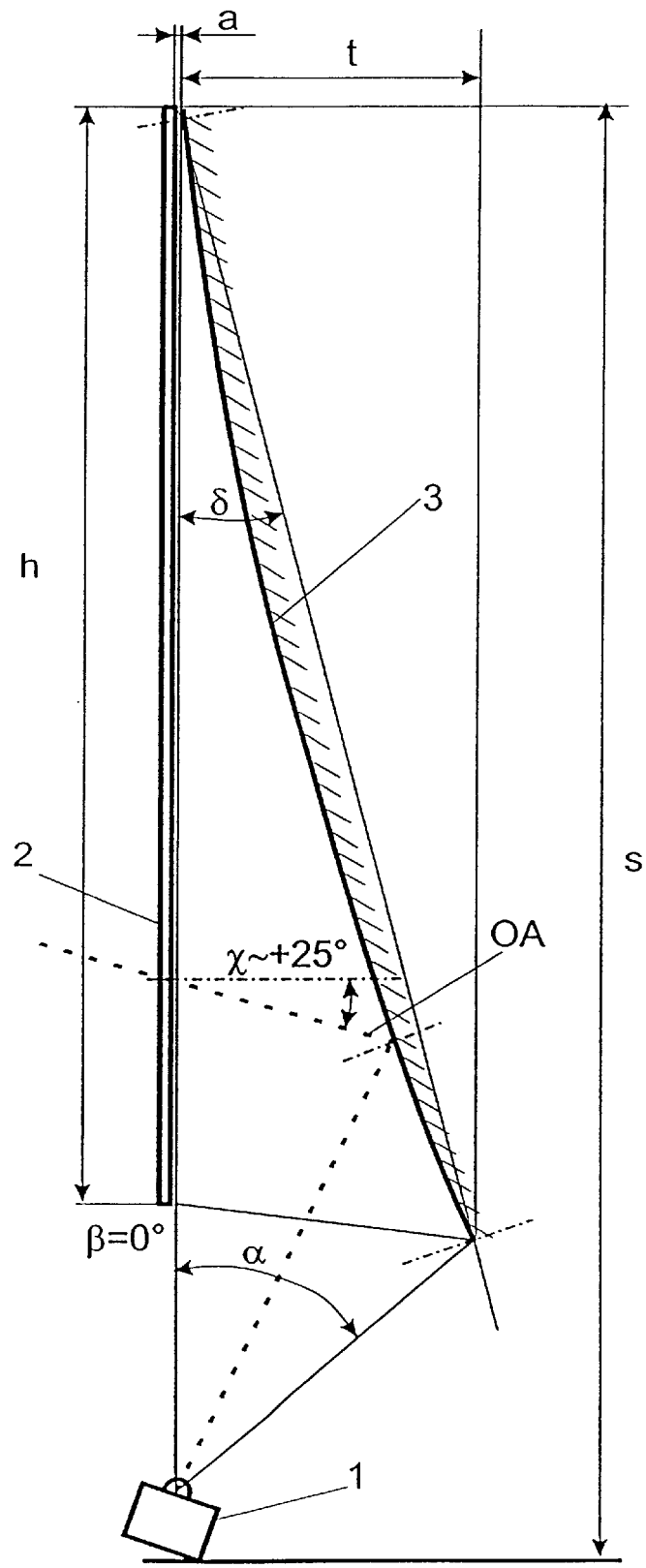
FIG. 5 is a side view of a rear projector with a magnifying, curved deflecting mirror.

FIG. 5 shows a construction similar to that in FIG. 4, but with concave deflecting mirror 3. In this case, a reduction in construction depth is also shown. The concave deflecting mirror 3 even expands the image so that depth is also reduced while the construction height remains the same. In this case, also, the curvature of the deflecting mirror 3 should be taken into account in the rectification.

As can be seen from FIG. 4 and FIG. 5, a curvature is generally advantageous for reducing the construction depth. In particular, this means that the curvature can also be advantageously selected in such a way that the distortion due to different angles of incidence or also the tangential dependency of the line spacing on the screen is compensated, which would obviate a recalculation of the image for rectification.

Figure 6:
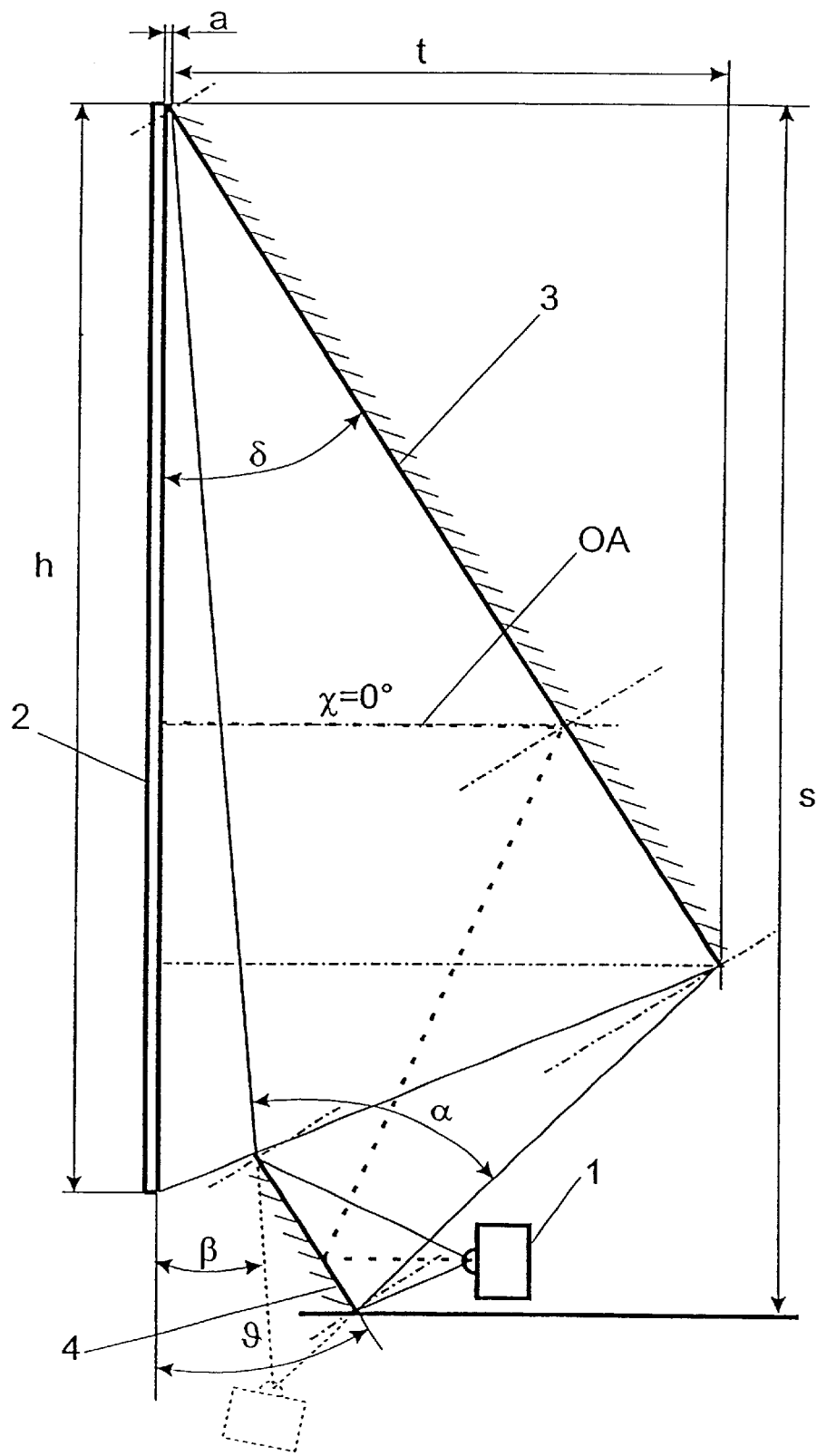
FIG. 6 shows a rear projector with two deflecting mirrors.

FIG. 6 shows another embodiment example for straight projection where X=0°. In order to further reduce the construction depth, another deflecting mirror 4 is provided in this case, the light path being folded once again by this additional deflecting mirror 4. This additional deflecting mirror 4 is arranged at an angle θ relative to the screen 2. It can be seen that advantageous projection ratios result when angle θ equals δ.

The additional deflecting mirror 4 results in a virtual image of the projection assembly 1, indicated by dashed lines in FIG. 6, so that, on this basis, ratios result such as those in the real images considered above. In particular, the vertex of the angle α which is essential for determining the optimum conditions according to the invention is also virtual in this case.

Figure 7:
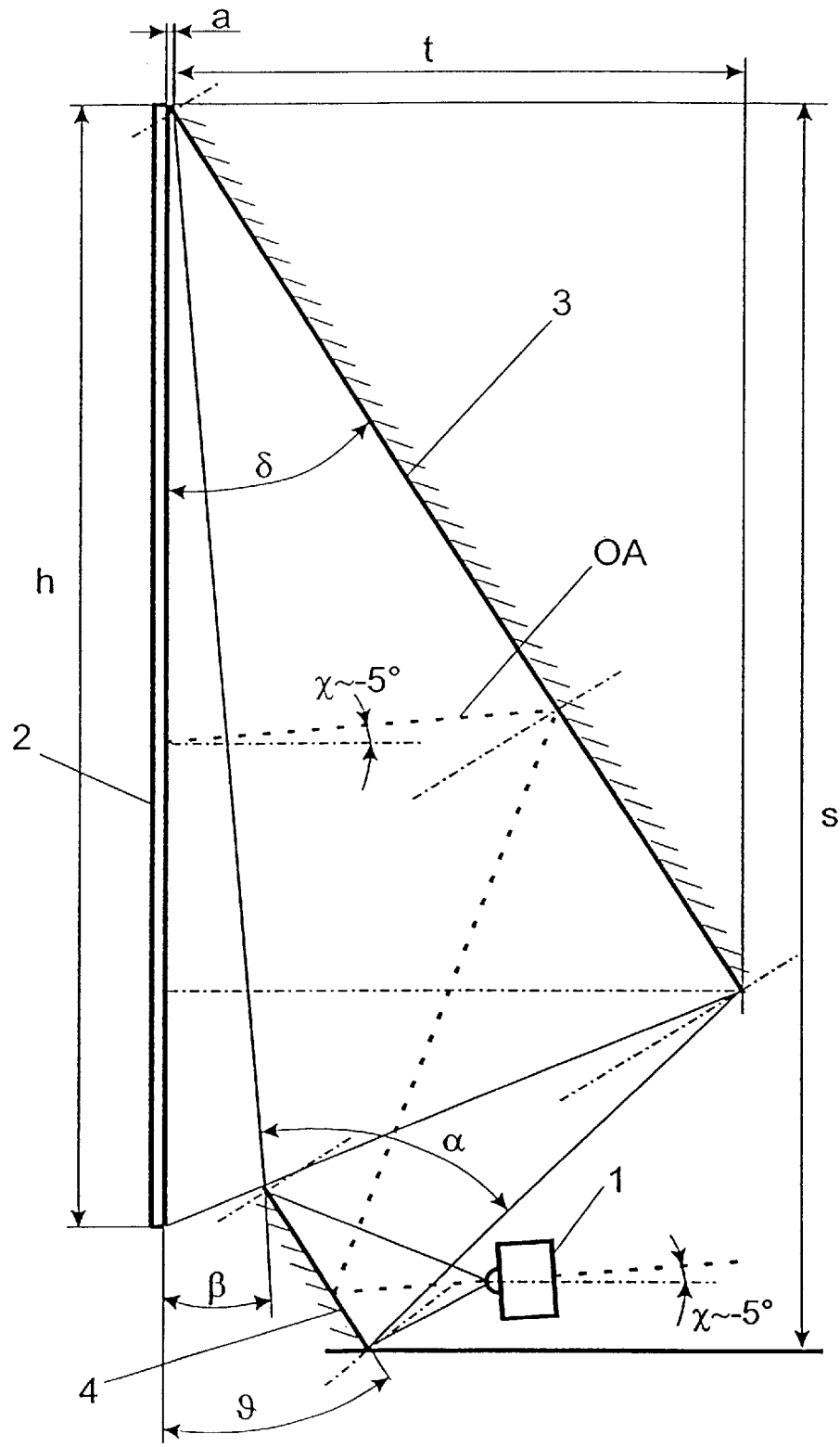
FIG. 7 shows a rear projector similar to that in FIG. 6, but for illustrating the effect of the angular positions of a component assembly of the projector.

FIG. 7 shows a rear projector in which a small oblique position of the projection assembly 1 is provided compared to FIG. 6, so that an oblique projection is effected at angle X=−5°. In this case, angles θ and δ are equal.

It can be seen in this connection that it is also possible in the case of an oblique projection arranged in this manner to compensate for distortions due to an altered angle δ which also result in a change in angle X by changing the angles of the projection assembly 1. However, in the case of a straight projection compensated in this way, angle δ can even be kept substantially smaller as was shown in the example in FIG. 2.

Figure 8:
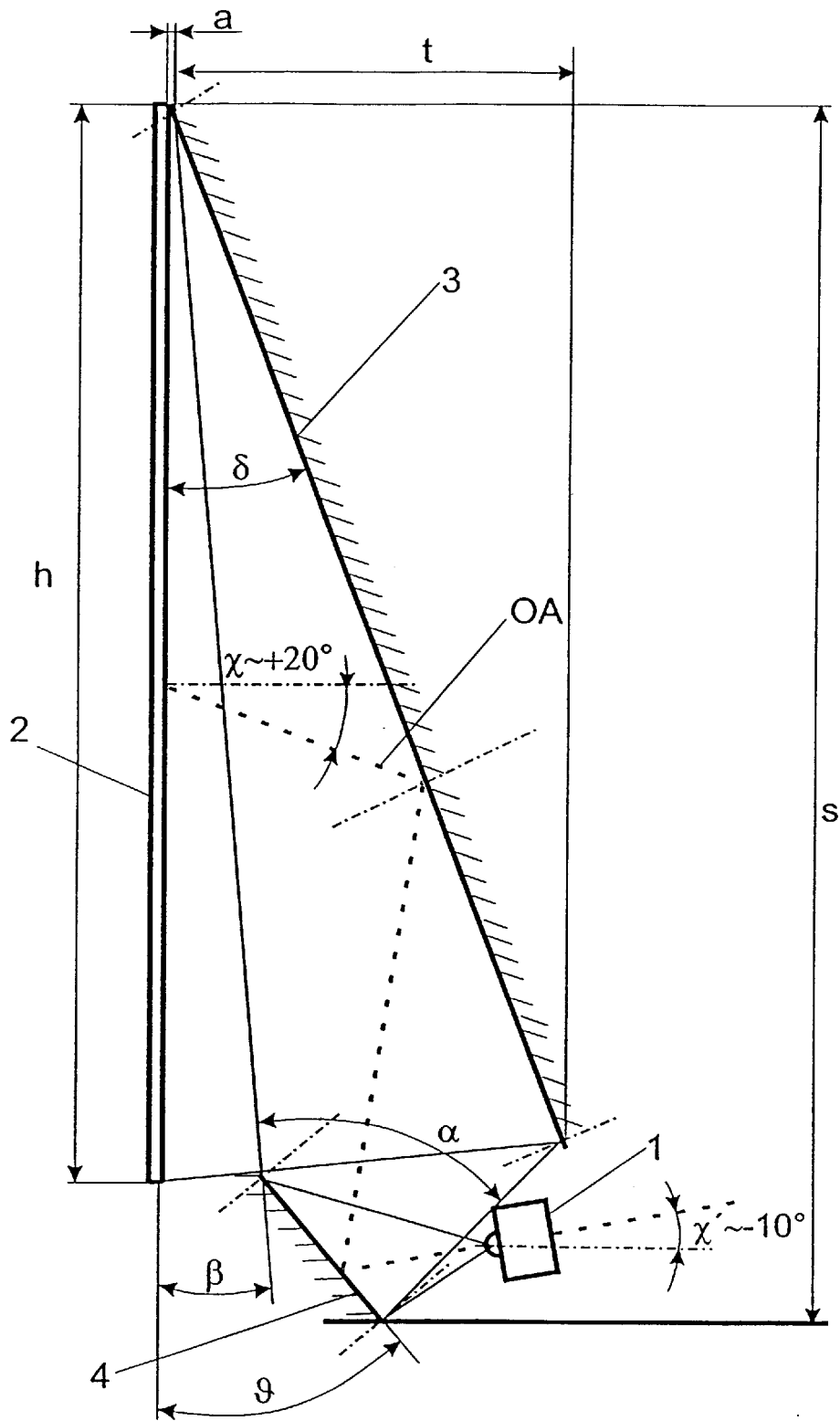
FIG. 8 shows a rear projector similar to that in FIG. 2, but with two deflecting mirrors arranged at an angle to one another.

FIG. 8 shows a similar embodiment example, wherein, however, angle δ is substantially smaller than angle θ, resulting in an incident angle of X=20°.

A comparison of the different embodiment examples shows that similar conditions are given while retaining the reduced device depths. In particular, it follows from the embodiment example in FIG. 8 that an oblique position of approximately X=20° is achieved at an angle of incidence X'=−10° of the projection assembly 1 on the screen. Thus, because of the changes in the projection angle of the projection assembly 1, different angles can be adjusted for distortion correction, so that a correction for geometric image errors can be dispensed with, for example, by a suitable selection of angle X' even at smaller angles δ.

Figure 9:
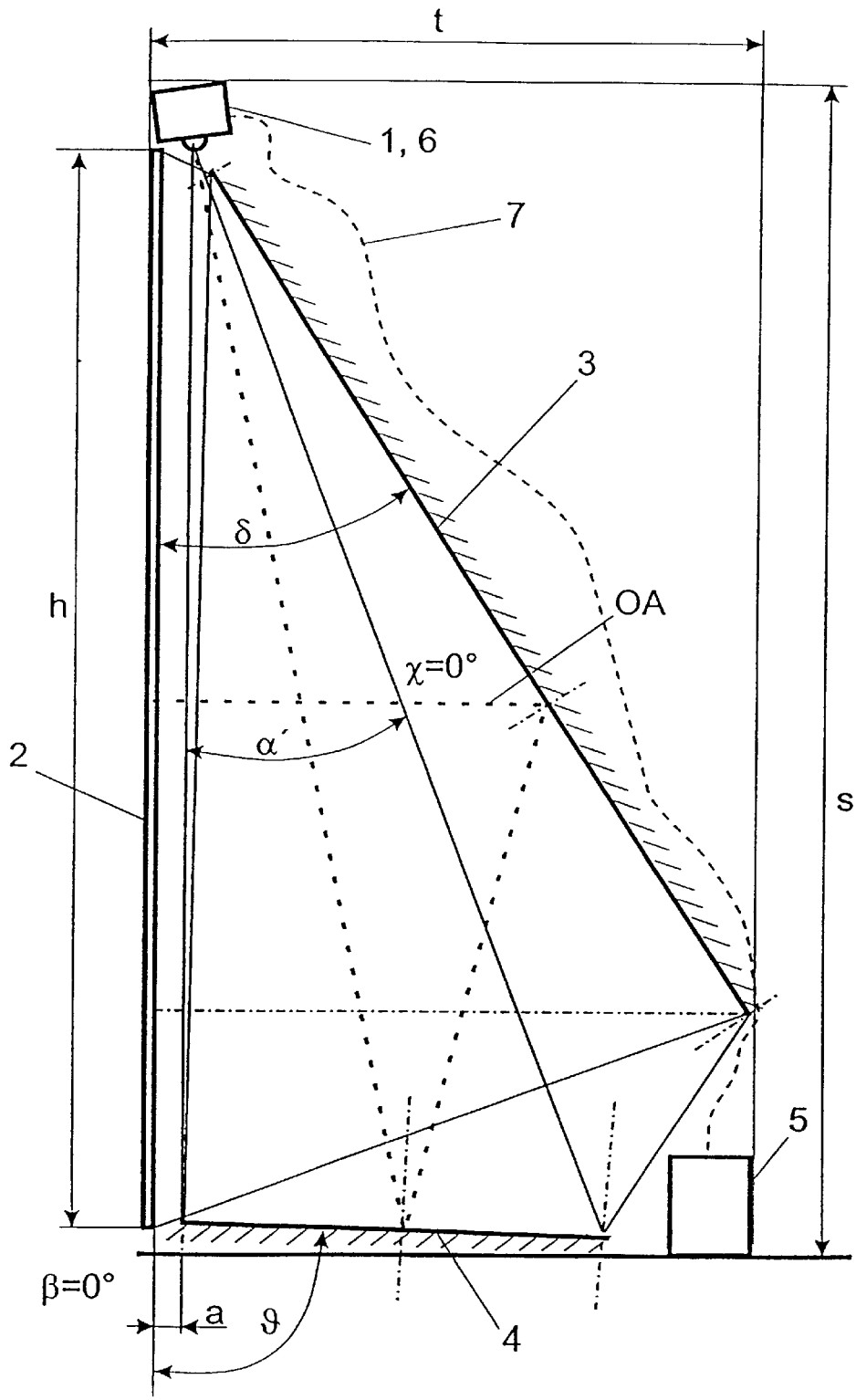
FIG. 9 shows another embodiment example of a rear projector with two deflecting mirrors.

FIG. 9 shows another embodiment example in which an increased distance a of up to 10 cm can be used. In this alternative case, the total projection assembly 1 is arranged above the screen 2. In this arrangement, an extremely large light path is formed which also leads to a reduction in the deflection angle α, in this case, α', because while angle α was approximately 45° in the previous examples, a substantially smaller angle is sufficient in this case while retaining the same image size, so that, for example, special magnification optics inside the projection assembly 1 could be omitted.

As an alternative to the construction mentioned above, a further improvement can be achieved in which a first assembly 6 is provided which is connected with a second assembly 5 via a light-conducting fiber 7. The first assembly 1 contains only the deflecting device as well as magnification optics, if any, while assembly 5 contains the laser, the modulators and electronic control devices. This arrangement is advantageous in that, because of the lasers in the embodiment example which, at present, are usually still heavy and so are arranged in the second assembly 5, the center of gravity is shifted sharply downward which increases the stability of the rear projector. The stability that can be achieved in this way to prevent tipping over is especially advantageous in the case of extremely flat projectors whose depth can be kept particularly small by using all of the features shown in the different embodiment examples.

The preceding examples show that the total construction depth can be reduced still further by combining angular adjustments and rectification correction as well as other supplementary steps, wherein the fixing of angle δ and β mentioned above is essential, Further, it was made clear from the above discussion that it is particularly advantageous to configure the deflecting mirror in such a way, either based on its angle δ or on a curvature, that an optical image distortion is carried out, wherein this optical image distortion is compensated by recalculating the image and by controlling the deflecting device with functions which counteract the distortion. The latter in particular is considered an additional essential aspect of the embodiment examples.

While the foregoing description and drawings represent the preferred embodiments of the present invention, it will be obvious to those skilled in the art that various changes and modifications may be made therein without departing from the true spirit and scope of the present invention.

What is claimed is:

1. A rear projector comprising:

a housing;

a screen arrangement on a front side of the housing for displaying a video picture;

a brightness-modulated and color-modulated R-G-B light source for emitting a light bundle;

a deflecting device for scanning said light bundle;

said deflecting device for deflecting said light bundle over a total angle $\alpha$ with respect to vertical scanning;

a deflecting mirror which is located in the housing and arranged at an angle $\delta$;

wherein the light bundle exiting from a real or virtual vertex of the total deflection angle $\alpha$ is deflected onto the screen by the deflecting mirror;

wherein the virtual or real vertex located in front of the deflecting mirror lies at a location where the smallest angle $\beta$ of the light bundle to the surface of the screen during deflection is less than 20° and the angle $\delta$ is given by $$\delta \leq 45° - \frac{\alpha}{4} + \beta;$$

and wherein angle $\delta$ is determined for curved mirror surfaces of the deflecting mirror between the projection surface given by the screen and the chord between the extreme points of incidence of the light bundle on the deflecting mirror during vertical scanning over the angle $\alpha$.

2. The rear projector according to claim 1, wherein the vertex is virtual and is generated by additional deflecting mirrors in the rear projector.

3. The rear projector according to claim 1, wherein a computing device by which the video picture is recalculated prior to projection with respect to distortion due to oblique projection or curvature of the deflecting mirror and by a control device which controls the deflection and/or intensity modulation of the light bundle, so that there appears on the screen in the image direction a virtually undistorted video picture which diverges from an equal distribution of lines by less than 30%, particularly less than 10%, with respect to line spacing.

4. The rear projector according to claim 1, wherein the distance of the screen from the point on the deflecting mirror on which the light bundle impinges at an angle $\beta$ is less than 10 cm and, in particular, less than 3 cm.

5. The rear projector according to claim 1, wherein the deflecting mirror is a plane mirror and a light bundle reflected at a deflection angle $\alpha/2$ in the direction of the deflecting mirror impinges vertically on the screen.

6. The rear projector according to claim 1, wherein the R-G-B light source is arranged on the base of the housing.

7. The rear projector according to claim 1, wherein the deflecting device is arranged at the base of the housing.

8. The rear projector according to claim 1, wherein the deflecting device has magnification optics that have been corrected for the tangential condition for proportional magnification of the tangent of the deflection angle.

* * * * *